United States Patent
Igarashi et al.

(10) Patent No.: US 6,459,597 B1
(45) Date of Patent: Oct. 1, 2002

(54) ELECTRIC POWER CONVERSION APPARATUS WITH NOISE REDUCTION DEVICE

(75) Inventors: Seiki Igarashi; Taichi Tanigawa, both of Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/015,946

(22) Filed: Dec. 17, 2001

(30) Foreign Application Priority Data

Dec. 19, 2000 (JP) ........................................ 2000-385005

(51) Int. Cl.$^7$ ................................................ H02J 1/02
(52) U.S. Cl. ........................................... 363/39; 363/34
(58) Field of Search .............................. 363/39, 40, 44, 363/45, 46, 47, 35, 36, 34; 388/909

(56) References Cited

U.S. PATENT DOCUMENTS 4,730,243 A  *  3/1988  Glennon .................... 363/126
5,345,375 A  *  9/1994  Mohan ...................... 307/105
5,499,178 A  *  3/1996  Mohan ...................... 307/105
6,069,800 A  *  5/2000  Cross et al. ................. 363/20

FOREIGN PATENT DOCUMENTS

JP          9-266677           10/1997

* cited by examiner

Primary Examiner—Shawn Riley
(74) Attorney, Agent, or Firm—Kanesaka & Takeuchi (57) ABSTRACT

An electric power conversion apparatus includes a noise reduction device for reducing the common mode noise and the normal mode noise caused by on/off of the switching devices of an electric power conversion apparatus for driving an AC motor. Since the noise-compensation-current supply circuit of the noise reduction device uses devices with a lower breakdown voltage, the operating speed of the noise-compensation-current supply circuit is higher than the operating speed of the conventional noise-compensation-current supply circuit which uses devices with a higher breakdown voltage equivalent to the DC voltage of the electric power conversion apparatus.

11 Claims, 5 Drawing Sheets

To the capacitor $C_1$ or to the mutual connection paint of the capacitors $C_2$ and $C_4$

Fig. 4(b)

to the capacitor $C_1$, or to the mutual connection paint of the capacitors $C_2$ and $C_3$ Fig. 5
Prior Art

ELECTRIC POWER CONVERSION APPARATUS WITH NOISE REDUCTION DEVICE

BACKGROUND OF THE INVENTION AND RELATED ART STATEMENT

The present invention relates to an electric power conversion apparatus having a noise reduction device for reducing a common mode noise and a normal mode noise caused by a switching device of an electric power conversion apparatus when operating an alternate current (as referred to AC from hereon) motor.

Figure 5:
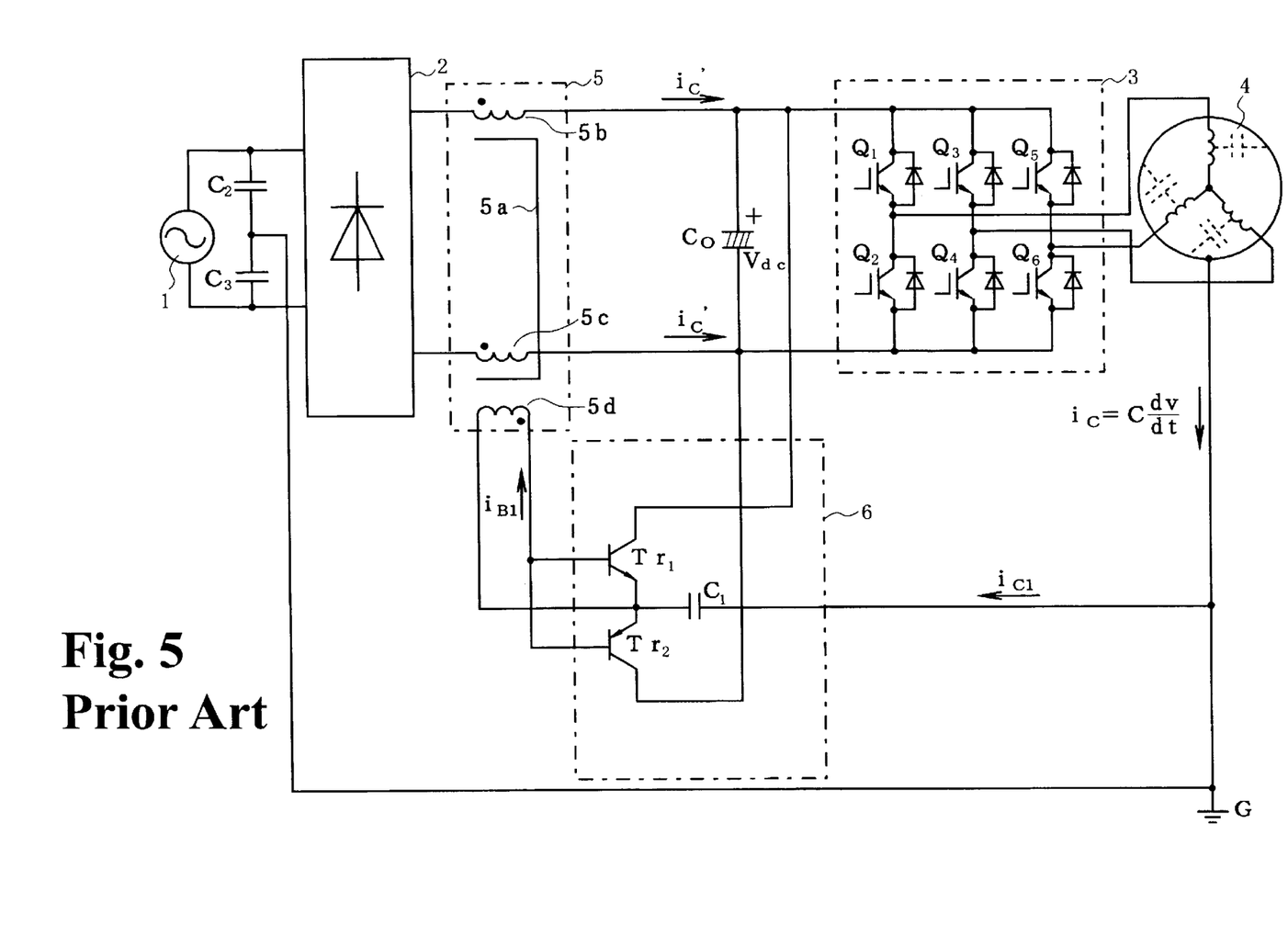
FIG. 5 is a circuit diagram of a conventional noise reduction device applied to a system, which drives a three-phase induction motor via a three-phase converter.

FIG. 5 is a circuit diagram of a conventional noise reduction device applied to a system, which drives a three-phase induction motor via a three-phase converter. The noise reduction device described in FIG. 5 is substantially the same with the noise reduction device disclosed in Japanese Unexamined Laid Open Patent Application No. H09-266677.

Shown in FIG. 5 are a single-phase AC power supply 1; a single-phase rectifying bridge circuit 2 as a converter; a three-phase inverter circuit 3 including semiconductor switching devices $Q_1$ through $Q_6$, such as IGBT (Insulated Gate Bipolar Transistor), and diodes connected in opposite parallel to the respective semiconductor switching devices; a three-phase induction motor 4 as a load of the inverter circuit 3; a noise current detector 5, such as a zero-phase current transformer formed of a ring core 5a, a pair of primary windings 5b and 5c, and a secondary winding 5d; a noise-compensation-current supply circuit 6 connected to both ends of the secondary winding 5d; and a Direct Current (as referred to DC from hereon) smoothing capacitor $C_0$ connected to a DC intermediate circuit between the rectifying circuit 2 and the inverter circuit 3. The polarity of each winding of the noise current detector 5 is set as shown in FIG. 5. The rectifying circuit 2, the DC smoothing capacitor $C_0$, and the inverter circuit 3 constitute an electric power conversion apparatus.

The noise-compensation-current supply circuit 6 includes a NPN (Negative-Positive-Negative) transistor $Tr_1$, a PNP (Positive-Negative-Positive) transistor $Tr_2$, and a coupling capacitor $C_1$ for cutting the DC component. Filter capacitors $C_2$ and $C_3$ are connected to both terminals of the AC power supply 1. Both ends of the secondary winding 5d are connected to the bases and the emitters of the transistors $Tr_1$ and $Tr_2$ constituting the noise-compensation-current supply circuit 6. The collector of the transistor $Tr_1$ is connected to the positive terminal of the ecapacitor $C_0$, and the collector of the transistor $Tr_2$ to the negative terminal of the capacitor $C_0$.

The frame of the induction motor 4 is grounded. The emitters of the transistors $Tr_1$ and $Tr_2$ are connected to a grounding point G via a coupling capacitor $C_1$. The mutual connection point of the capacitors $C_2$ and $C_3$ is also connected to the grounding point G. In FIG. 5, the switching devices $Q_1$ through $Q_6$ of the inverter circuit 3 are controlled by PWM (Pulse Code Modulation), which is omitted from FIG. 5.

The operations of the conventional noise reduction device will be described below. The switching devices $Q_1$ through $Q_6$ of the inverter circuit 3 are controlled to switch on and off by the PWM pulses. The induction motor 4 is driven by the output of the inverter circuit 3. Since electrostatic capacitance (floating capacitance) C exists between the windings of the induction motor 4 and the grounding point G as shown by the broken lines in FIG. 5, a leakage current pulse (common mode noise current) $I_C$ flows through the electrostatic capacitance C whenever a voltage pulse is applied form the inverter circuit 3 to the induction motor 4. Since the noise current flowing straight through the grounding point G causes an electric shock and malfunction of the ground breaker, the noise current needs to be eliminated.

The noise current detector 5 detects the noise current (zero-phase current component) from the difference of the currents $i_C'$ flowing through a pair of power supply lines of the DC intermediate current. When a noise current is detected, the noise current detector 5 makes a detection current $i_{B1}$ flow through the secondary winding 5d. The detection current $i_{B1}$ drives the transistors $Tr_1$ or $Tr_2$.

The detection current $i_{B1}$, which has flowed into the base of the transistor $Tr_1$ or $Tr_2$, is amplified by the transistor $Tr_1$ or $Tr_2$, causing a current $ic_1$. The transistors $Tr_1$ and $Tr_2$ switches on and off in opposite to each other such that when the transistor $Tr_1$ is ON, the transistor $Tr_2$ is OFF, and, when the transistor $Tr_1$ is OFF, the transistor $Tr_2$ is ON.

When the noise current ic flows in the direction indicated by the arrow in FIG. 5, the current $i_{B1}$ caused by the current $i_C'$ flowing through the primary windings 5b and 5c flows through the secondary winding 5d. The current $i_{B1}$ switches on the transistor $Tr_2$, and the noise compensation current $ic_1$ circulates from the capacitor $C_0$ to the capacitor $C_0$ via any of the switching devices on the upper arm of the inverter circuit 3, the electrostatic capacitance C of the induction motor 4, the coupling capacitor $C_1$, and the transistor $Tr_2$.

Since most of the noise current $i_C$ flows as the current $i_{C1}$, the current $i_C'$ (=$i_C$-$i_{C1}$) flowing to the output side of the rectifying circuit 2 is reduced, and the noise voltage (the noise voltage at the AC input side terminal of the rectifying circuit 2) is also reduced.

Since the direction of the current $i_{B1}$ flowing through the secondary winding 5d becomes opposite when the direction of the noise current $i_C$ is opposite, the transistor $Tr_1$ is switched on. Therefore, the noise compensation current $i_{C1}$ circulates from the capacitor $C_0$ to the capacitor $C_0$ via the transistor $Tr_1$, the coupling capacitor $C_1$, the electrostatic capacitance of the induction motor 4, and anyone of the switching devices on the lower arm of the inverter circuit 3. Since most of the noise current $i_C$ flows as the $i_{C1}$ in this case as well, the current $i_C'$ (=$i_C$-$i_{C1}$) is reduced, and the noise voltage is also reduced.

Since the transistors $Tr_1$ and $Tr_2$ constituting the noise-compensation-current supply circuit 6 are connected via the respective collectors thereof to the smoothing capacitor $C_0$, it is required that the breakdown voltages of the transistors $Tr_1$ and $Tr_2$ be high enough to endure the DC voltage of the inverter circuit 3.

In the general purpose inverter, the AC input voltage (the effective value) thereof is 200 V, and the DC voltage (DC intermediate voltage) is around 500 V. When the AC input voltage thereof is 400 V, the DC voltage is around 1000 V. Therefore, it is necessary for the transistors $Tr_1$ and $Tr_2$ to exhibit a breakdown voltage high enough to endure these DC voltages.

However, since commercially available transistors with the breakdown voltage of 500 V operate less than half speed as that of the transistor with the breakdown voltage of 300 V, the transistor with the breakdown voltage of 500 V is not so effective to reduce the noise current.

Especially in the high frequency range, wherein the operating frequency of the inverter exceeds 1 MHz, the transistors constituting the noise-compensation-current supply circuit 6 sometimes can not catch up with such a high speed. Sometimes, the transistors constituting the noise-compensation-current supply circuit 6 operate in the opposite polarity of the noise current $i_C$, resulting in amplifying noise voltage in the high frequency range.

To obviate this problem, it is necessary to employ a high frequency filter to cut the high frequency noises in addition to the filter capacitors $C_2$ and $C_3$. The additional high frequency filter enlarges the electric power conversion apparatus and increases the cost of the apparatus.

It is an object of the invention to provide a noise reduction device, which can use elements with lower breakdown voltage than the DC voltage of the inverter, and an electric power conversion apparatus with the noise reduction device, as the current control devices of the noise-compensation-current supply circuit.

It is another object of the invention to provide a noise reduction device, which prevents high frequency noises from causing and minimizes the high frequency filter, and the entire electric power conversion apparatus with the noise reduction device when the operating frequency of the electric power conversion apparatus is in the high frequency range.

It is also expected to minimize the size of high frequency filters and reduce the number of parts, resulting in reduced manufacturing cost of the electric power conversion apparatus.

SUMMARY OF THE INVENTION

According to a first aspect of the invention, there is provided a noise reduction device for an electric power conversion apparatus. The electric power conversion apparatus includes a converter connected to an AC power supply, a DC intermediate circuit connected to the DC output side of the converter, an inverter connected to the DC intermediate circuit and having semiconductor switching devices, and a DC smoothing capacitor connected to the DC intermediate circuit. The noise reduction device reduces a noise current caused by on and off switching of the semiconductor switching devices and flowing through the electric power conversion apparatus. The noise reduction device includes noise current detecting means for detecting the noise current and outputting a detection signal indicating the noise current; and noise-compensation-current supply means for supplying a noise compensation current for reducing the detected noise current to the electric power conversion apparatus. The noise-compensation-current supply means includes a series circuit having a current control device and a constant DC voltage supply. The output current of the current control device is controlled based on the detection signal from the noise current detecting means. The current control device exhibits a breakdown voltage lower than the voltage of the DC intermediate circuit.

Advantageously, the noise current detecting means is connected to the DC intermediate circuit to detect a common mode noise current flowing from the electric power conversion apparatus to the grounding point via the load of the electric power conversion apparatus. The noise-compensation-current supply means generates, based on the detection signal from the noise current detecting means, a current for canceling the noise current flowing through the DC intermediate circuit and supplies the current for canceling to the DC intermediate circuit.

Advantageously, the noise current detecting means is connected to the DC intermediate circuit to detect a normal mode noise current flowing between the AC power supply and the load of the electric power conversion apparatus via the electric power conversion apparatus. The noise-compensation-current supply means generates, based on the detection signal from the noise current detecting means, a current for canceling the noise current flowing through the DC intermediate circuit and supplies the current for canceling to the DC intermediate circuit.

According to a second aspect of the invention, there is provided a noise reduction device for an electric power conversion apparatus. The electric power conversion apparatus includes a converter connected to an AC power supply, a DC intermediate circuit connected to the DC output side of the converter, an inverter connected to the DC intermediate circuit and having semiconductor switching devices, and a DC smoothing capacitor connected to the DC intermediate circuit. The noise reduction device reduces a common mode noise current caused by on and off switching of the semiconductor switching devices and flowing from the electric power conversion apparatus to the grounding point via the load of the electric power conversion apparatus. The noise reduction device includes noise current detecting means having a transformer, which detects the difference between the noise current flowing through one of the power supply lines of the DC intermediate circuit and the noise current flowing through the other of the power supply lines, the noise current detecting means outputting a detection signal indicating the current difference; and a noise-compensation-current supply means for supplying a noise compensation current for reducing the detected noise current to the electric power conversion apparatus.

The noise-compensation-current supply means includes a pair of current control devices and a constant DC voltage supply or a pair of constant DC voltage supplies. First output terminals of the respective current control devices are grounded, and the current control devices control the output current thereof based on the detection signal from the transformer. The constant DC voltage supply is connected between the second output terminal of either one of the current control devices and either one of the terminals of the DC smoothing capacitor, or the constant DC voltage supplies being connected between the respective second output terminals of the current control devices and the respective terminals of the DC smoothing capacitor. The current control devices exhibits a breakdown voltage lower than the voltage of the DC intermediate circuit.

According to a third aspect of the invention, there is provided a noise reduction device for an electric power conversion apparatus. The electric power conversion apparatus includes a converter connected to an AC power supply, a DC intermediate circuit connected to the DC output side of the converter, an inverter connected to the DC intermediate circuit and having semiconductor switching devices, and a DC smoothing capacitor connected to the DC intermediate circuit. The noise reduction device reduces a normal mode noise current caused by on and off switching of the semiconductor switching devices and flowing between the AC power supply and the load of the electric power conversion apparatus via the electric power conversion apparatus. The noise reduction device includes noise current detecting means having a transformer which detects the sum of the noise current flowing through one of the power supply lines of the DC intermediate circuit and the noise current flowing through the other one of the power supply lines, and outputting a detection signal indicating the current sum; and noise-compensation-current supply means for supplying a noise compensation current for reducing the detected noise current to the electric power conversion apparatus.

The noise-compensation-current supply means includes a pair of current control devices and a constant DC voltage supply or a pair of constant DC voltage supplies. First, output terminals of the respective current control devices are connected to the input side of the converter. The current control devices control the output current thereof based on the detection signal from the transformer. The constant DC voltage supply is connected between a second output terminal of either one of the current control devices and either one of the terminals of the DC smoothing capacitor, or the constant DC voltage supply is connected between the respective second output terminals of the current control devices and the respective terminals of the DC smoothing capacitor. The current control devices exhibit a breakdown voltage lower than the voltage of the DC intermediate circuit.

According to a fourth aspect of the invention, there is provided a noise reduction device for an electric power conversion apparatus. The electric power conversion apparatus includes a converter connected to an AC power supply, a DC intermediate circuit connected to the DC output side of the converter, an inverter connected to the DC intermediate circuit and having semiconductor switching devices, and a DC smoothing capacitor connected to the DC intermediate circuit. The noise reduction device reduces a common mode noise current caused by on and off switching of the semiconductor switching devices and flowing from the electric power conversion apparatus to the grounding point via the load of the electric power conversion apparatus. The noise reduction device includes noise current detecting means including a transformer, which detects the difference between the noise current flowing through one of the power supply lines of the DC intermediate circuit and the noise current flowing through the other of the power supply lines, the noise current detecting means outputting a detection signal indicating the current difference; and noise-compensation-current supply means for supplying a noise compensation current for reducing the detected noise current to the electric power conversion apparatus.

The noise-compensation-current supply means includes a series circuit formed of a first current control device and a second current control device, and a constant DC voltage supply connected between one end of the series circuit and the DC smoothing capacitor. The first current control device and the second control device switch on and off opposite to each other based on the detection signal from the transformer. The mutual connection point of the first current control device and the second current control device is grounded. The first current control device and the second current control device exhibit a breakdown voltage lower than the voltage of the DC intermediate circuit.

According to a fifth aspect of the invention, there is provided a noise reduction device for an electric power conversion apparatus. The electric power conversion apparatus includes a converter connected to an AC power supply, a DC intermediate circuit connected to the DC output side of the converter, an inverter connected to the DC intermediate circuit and having semiconductor switching devices, and a DC smoothing capacitor connected to the DC intermediate circuit. The noise reduction device reduces a normal mode noise current caused by on and off switching of the semiconductor switching devices and flowing between the AC power supply and the load of the electric power conversion apparatus via the electric power conversion apparatus. The noise reduction device includes noise current detecting means including a transformer, which detects the sum of the noise current flowing through one of the power supply lines of the DC intermediate circuit and the noise current flowing through the other one of the power supply lines, the noise current detecting means outputting a detection signal indicating the current sum; and noise-compensation-current supply means for supplying a noise compensation current for reducing the detected noise current to the electric power conversion apparatus.

The noise-compensation-current supply means includes a series circuit formed of a first current control device and a second current control device, and a constant DC voltage supply connected between one end of the series circuit and the DC smoothing capacitor. The first current control device and the second control device are switched on and off opposite to each other based on the detection signal from the transformer. The mutual connection point of the first current control device and the second current control device is connected to the input side of the converter. The first current control device and the second current control device exhibit a breakdown voltage lower than the voltage of the DC intermediate circuit.

According to a sixth aspect of the invention, the noise-compensation-current supply means, which supplies a noise compensation current for compensating the common mode noise current, includes a series circuit formed of a first current control device and a second current control device, a first constant DC voltage supply, and a second constant DC voltage supply. The first constant DC voltage supply and the second constant DC voltage supply are connected between the respective ends of the series circuit and the respective terminals of the DC smoothing capacitor.

According to a seventh aspect of the invention, the noise-compensation-current supply means, which supplies a noise compensation current for compensating the normal mode noise current, includes a series circuit formed of a first current control device and a second current control device, a first constant DC voltage supply, and a second constant DC voltage supply. The first constant DC voltage supply and the second constant DC voltage supply are connected between the respective ends of the series circuit and the respective ends of the DC smoothing capacitor.

Advantageously, the output terminals on the side, to which a constant DC voltage supply is not connected, of the current control devices are grounded via a coupling capacitor.

Advantageously, the output terminals on the side, to which a constant DC voltage supply is not connected, of the current control devices are connected to the mutual connection point of filter capacitors connected between the input terminals of the converter.

Advantageously, the constant DC voltage supply is a zener diode.

DETAILED DESCRIPTION OF PREFERRED EMBODIMENTS

The invention will be described in detail hereinafter with reference to the accompanied drawings illustrating the preferred embodiments of the invention.

Figure 1:
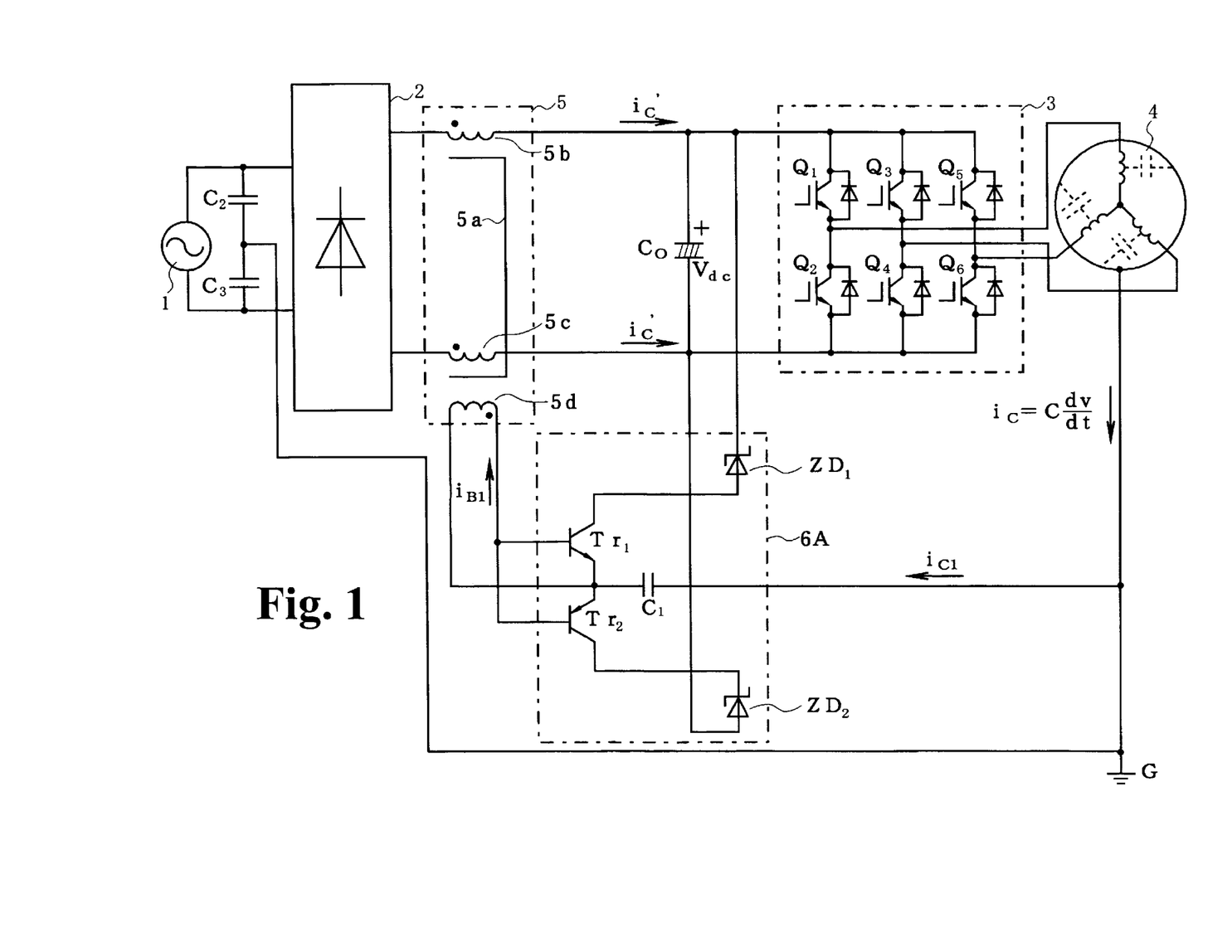
FIG. 1 is a circuit diagram of an electric power conversion apparatus including a noise reduction device according to the first embodiment of the invention.

FIG. 1 is a circuit diagram of an electric power conversion apparatus including a noise reduction device according to the first embodiment of the invention. Shown in FIG. 1 are a single-phase AC power supply 1; a single-phase rectifying bridge circuit 2; a three-phase inverter circuit 3 including semiconductor switching devices $Q_1$ through $Q_6$, such as IGBTs (Insulated Gate Bipolar Transistors) and diodes connected in opposite parallel to the respective semiconductor switching devices; a three-phase induction motor 4 as a load of the inverter circuit 3; a noise current detector 5, such as a zero-phase current transformer formed of a ring core 5a, a pair of primary windings 5b and 5c, and a secondary winding 5d; filter capacitors $C_2$ and $C_3$, a DC smoothing capacitor Co; and a noise-compensation-current supply circuit 6A.

The noise-compensation-current supply circuit 6A is different from the conventional noise-compensation-current supply circuit 6 shown in FIG. 5 as a prior art. In this embodiment, a zener diode $ZD_1$ as a first constant DC voltage supply is connected between the transistor $Tr_1$ as a current control device and the positive terminal of the capacitor $C_0$, and a zener diode $ZD_2$ as a second constant DC voltage supply is connected between the transistor $Tr_2$ as a current control device and the negative terminal of the capacitor Co.

The zener diodes are connected such that the anode of the zener diode $ZD_1$ is connected to the collector of the transistor $Tr_1$, and the cathode of the zener diode $ZD_2$ is connected the collector of the transistor $Tr_2$.

Figure 2:
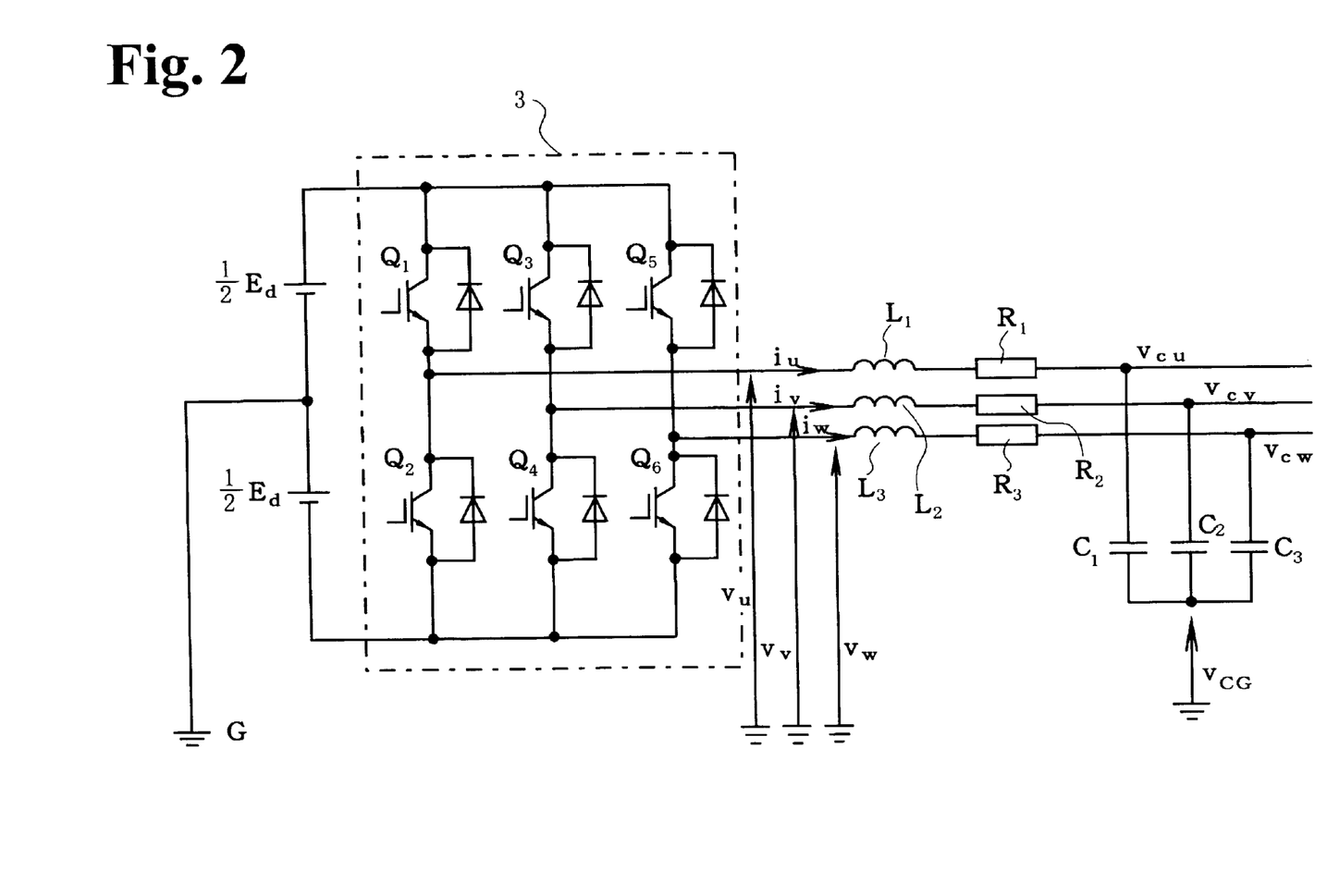
FIG. 2 is an equivalent circuit diagram of the three-phase inverter of FIG. 1.

FIG. 2 is an equivalent circuit diagram of the three-phase inverter. In FIG. 2, the wiring inductance of each output line of each phase between the connection point of the upper and lower arms of the inverter circuit 3 and the induction motor 4 is represented by $L_1$, $L_2$ or $L_3$, and the resistance thereof by $R_1$, $R_2$ or $R_3$. The floating capacitance, which the induction motor 4 has with respect to the grounding point, is represented by $C_1$, $C_2$ or $C_3$. The DC voltage of the inverter is represented by Ed (which is $V_{dc}$ in FIG. 1). It is assumed that the point, the potential thereof is Ed/2, is grounded.

The voltages of the phases outputted from the inverter circuit 3 are represented by $v_U$, $v_V$ and $v_W$, and the currents of the phases by $i_U$, $i_V$ and $i_W$. Then, the voltages of the phases are expressed by the following voltage equations (1) through (3). In the equations (1) through (3), $V_{CG}$ represents the potential to the ground at the neutral point of the output terminals of the three-phase inverter beyond the wiring inductance $L_1$ through $L_3$ and the resistance $R_1$ through $R_3$, and $v_{CU}$, $v_{CV}$ and $v_{CW}$ represent the potentials of the three phases. The quantities such as the voltages and the currents described above are vector quantities.

$$v_U - v_{CG} = L_1 di_U/dt + R_1 \cdot i_U + v_{CU} \quad (1)$$

$$v_V - v_{CG} = L_2 di_V/dt + R_2 \cdot i_V + v_{CV} \quad (2)$$

$$v_W - v_{CG} = L_3 di_W/dt + R_3 \cdot i_W + v_{CW} \quad (3)$$

As described in the following equations (4) through (6), it is assumed that the wiring inductance values $L_1$ through $L_3$ of the output lines for the three phases of the inverter are equal to each other, the resistance values $R_1$ through $R_3$ of the output lines of the inverter are equal to each other, and the floating capacitance values $C_1$ trough $C_3$ are equal to each other.

$$L_1 = L_2 = L_3 = L \quad (4)$$

$$R_1 = R_2 = R_3 = R \quad (5)$$

$$C_1 = C_2 = C_3 = C \quad (6)$$

The following equation (7) is obtained by adding the equations (1) through (3).

$$v_U + v_V + v_W - 3v_{CG} = L \cdot d(i_U + i_V + i_W)/dt + R \cdot (i_U + i_V + i_W) + v_{CU} + v_{CV} + v_{CW} \quad (7)$$

Assuming that the output voltages of the three phases are in equilibrium, the following equations (8) and (9) are obtained.

$$v_{CU} + v_{CV} + v_{CW} = 0 \quad (8)$$

$$i_U + i_V + i_W = 0 \quad (9)$$

By substituting the equations (8) and (9) for $v_{CU} + v_{CV} + v_{CW}$ and for $i_U + i_V + i_W$ in the equation (7), $v_{CG}$ is described by the following equation (10).

$$v_{CG} = (v_U + v_V + v_W)/3 \quad (10)$$

According to the equation (10), the potential $v_{CG}$ to the ground at the neutral point of the output terminals of the three-phase inverter is one third for the sum of the voltages of the three phase.

Since each of the voltages $v_u$, $v_v$ and $v_w$ is $(-\frac{1}{2}) \cdot$Ed or $(\frac{1}{2}) \cdot$Ed depending on the on/off states of the switching devices $Q_1$ through $Q_6$, the voltage of each phase varies with the variation of the voltage Ed. When the state of the switching device for one phase is changed, one third of the variation of the phase voltage is produced as variation $\Delta v_{CG}$ of the potential to the ground at the AC neutral point. Therefore, the potential variation $\Delta v_{CG}$ is described by the following equation (11).

$$\Delta v_{CG} = Ed/3 \quad (11)$$

In other words, when the switching devices of the three-phase inverter operate, the potential $V_{CG}$ to the ground at the AC neutral point changes by one third of the DC voltage Ed. Therefore, the voltage between the collector and the emitter of the transistors $Tr_1$ and $Tr_2$ of the noise-compensation-current supply circuit 6A in FIG. 1 changes by one third of the DC voltage Ed (same as $V_{CG}$). As a result, it is enough for the transistors $Tr_1$ and $Tr_2$ to exhibit a breakdown voltage of Ed/3. By setting the zener voltage of the zener diodes ZD1 and Zd2, which are constant DC voltage supplies, at ⅔ of Ed, the noise compensation current $i_{C1}$ may be made to flow in the same way as the conventional noise-compensation-current supply circuit 6, even when the voltages applied to the transistors lowers.

For the conventional general purpose inverter where the AC input voltage thereto is 200 V, it is necessary to use transistors with the breakdown voltage around DC 500 V, which corresponds to AC 200 V. In contrast, according to the invention, it becomes possible to use the transistors with the breakdown voltage around DC 150 V. When the AC input voltage is 400 V, while the transistors with the breakdown voltage DC 1000 V are required to be used in the prior art, the breakdown voltage DC 300 V is enough in the present invention.

The basic operation for compensating the noise current according to the first embodiment is the same with that according to the prior art. When a noise current $i_C$ caused by the switching operations of the inverter circuit 3 flows in the direction indicated by the arrow in FIG. 1, the current $i_C{}'$ flows through the primary windings 5b and 5c of the noise current detector 5. A current $i_{B1}$, which flows through the secondary winding 5d caused by the current $i_C{}'$, switches on the transistor $Tr_2$. When the transistor $Tr_2$ is switched on, a noise compensation current $i_{C1}$ flows via the coupling capacitor $C_1$. Since the most part of the noise current $i_C$ flows as the noise compensation current $i_{C1}$ toward the current control devices, the current $i_C{}'$ ($=i_C-i_{C1}$) is reduced, and the noise voltage at the input side terminal of the rectifying circuit 2 is reduced.

When the transistor $Tr_2$ is on, the voltage between the collector and the emitter of the transistor $Tr_2$ is about one third of the DC voltage $V_{dc}$ due to the function of the zener diode $DZ_2$.

When the noise current $i_C$ flows to the opposite direction, the current $i_{B1}$, which flows through the secondary winding 5d in the direction opposite to that described in FIG. 1, switches on the other transistor $Tr_1$, and the noise compensation current $i_{C1}$ flows via the coupling capacitor $C_1$. Since the most part of the noise current $i_C$ flows as the noise compensation current $i_{C1}$ in this case too, the current $i_C{}'$ ($=i_C/i_{C1}$) is reduced.

When the transistor $Tr_1$ is on, the voltage between the collector and the emitter of the transistor $Tr_1$ is about one third of the DC voltage of the inverter due to the function of the zener diode $DZ_1$.

According to the first embodiment, transistors with a lower breakdown voltage can be used for the current control devices of the noise-compensation-current supply circuit 6A. Therefore, the use of transistors with the low breakdown voltage facilitates speeding up the noise compensation operation as compared with the use of transistors with a high breakdown voltage.

According to the first embodiment, since the noise current is reduced even when the inverter is operated at a high frequency and it is not necessary to add a high frequency filter, the number of constituent parts and components can be reduced. Also the circuit configuration can be simplified, and as a result, the manufacturing costs can be lowered.

Figure 3:
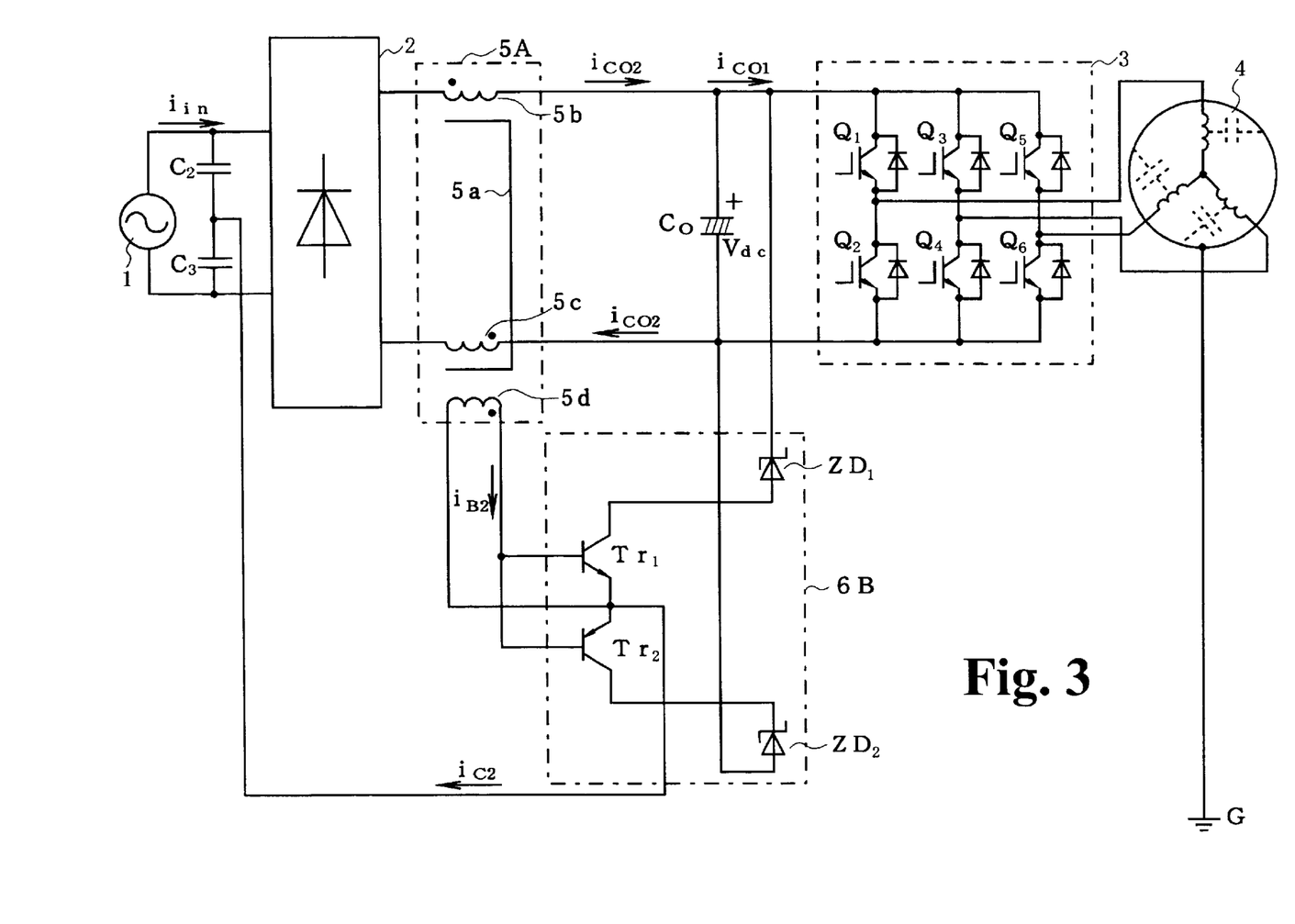
FIG. 3 is a circuit diagram of an electric power conversion apparatus including a noise reduction device according to the second embodiment of the invention.

FIG. 3 is a circuit diagram of an electric power conversion apparatus including a noise reduction device according to the second embodiment of the invention. In FIG. 3, the same numbers as used in FIG. 1 are used to designate the same elements. A noise reduction device according to the second embodiment is designed to reduce a normal mode noise, which flows between the AC power supply and the load via the electric power conversion apparatus.

According to the second embodiment, the polarity of the primary winding 5c in the noise current detector 5 is opposite to that of the primary winding 5c in the first embodiment such that the secondary winding 5d detects the sum between the currents flowing through the primary windings 5b and 5c as a normal mode noise current. The normal mode noise current is caused by the on/off of the switching devices Q1 through Q6 of the inverter circuit 3, and flows between the AC power supply 1 and the induction motor 4 via the electric power conversion apparatus (including the rectifying circuit 2, the DC smoothing capacitor $C_0$, and the inverter circuit 3). The normal mode noise current flows through the same path with that of the ordinary load current.

The electric power conversion apparatus shown in FIG. 3 includes a noise-compensation-current supply circuit 6B. The coupling capacitor $C_1$ in FIG. 1 is omitted from the noise-compensation-current supply circuit 6B. The emitters of the transistors Tr1 and Tr2, at which the transistors Tr1 and Tr2 are connected to each other, are connected to the mutual connection point of the filter capacitors $C_2$ and $C_3$.

The operation of the noise-compensation-current supply circuit according to the second embodiment will be described. A current $i_{C01}$ flows from the capacitor $C_0$ in response to the switching devices Q1 through Q6 of the inverter circuit 3. Since the voltage of the capacitor $C_0$ varies due to the current $i_{C01}$, a noise current $i_{C02}$ corresponding to the current $i_{C01}$ flows from the side of the AC power supply 1.

The noise current $i_{C02}$ causes a current $i_{B2}$ in the secondary winding 5d of a noise current detector 5A. The current $i_{B2}$, which has flowed in the base of the transistor $Tr_1$ or $Tr_2$, is amplified by the transistor $Tr_1$ or $Tr_2$, causing a current $i_{C2}$.

When the current $i_{C02}$ flows, for example, in the direction indicated by the arrow in FIG. 3, the current $i_{B2}$ flows through the secondary winding 5d of the noise current detector 5A to the direction indicated by the arrow in FIG. 3. The current $i_{B2}$ switches on the transistor $Tr_1$, and a current $i_{C2}$ circulates from the capacitor $C_2$ to the capacitor $C_2$ via the positive terminal of the rectifying circuit 2, the primary winding 5b, the zener diode $ZD_1$ and the transistor $Tr_1$.

Since the most part of the noise current $i_{C02}$ flows as the current $i_{C2}$, the noise current $i_{C02}$ circulates through the capacitor $C_2$ as described above without flowing through the AC power supply 1. Therefore, a current $i_{in}$ ($=i_{C02}-i_{C2}$) flowing though the AC power supply 1 becomes small, and the noise voltage at the input side terminal of the rectifying circuit 2 is also reduced.

When the direction of the noise current $i_{C02}$ is opposite to the direction shown in FIG. 3, the direction of the current $i_{B2}$ flowing through the secondary winding 5d of the noise current detector 5A becomes also opposite to the flow direction shown in FIG. 3. The current $i_{B2}$ switches on the transistor $Tr_2$, and the current $i_{C2}$ circulates from the capacitor $C_3$ to the capacitor $C_3$ via the transistor $Tr_2$, the zener diode $ZD_2$, the primary winding 5c and the negative terminal of the rectifying circuit 2. In this case, the $i_{C02}$ is canceled by the current $i_{C2}$ flowing in opposite thereto. The current $i_{in}$ ($=i_{C2}/i_{C02}$) flowing though the AC power supply 1 becomes small, and the noise voltage at the input side terminal of the rectifying circuit 2 is also reduced.

According to the second embodiment, it is enough for the operating voltage (the voltage between the collector and the emitter) of the transistors $Tr_1$ and $Tr_2$ to be as high as the ripple voltage of the capacitor $C_0$, which is from several to several tens V for the general electric power conversion apparatus. When the operating voltage of the transistors $Tr_1$ and $Tr_2$ is several tens V, by setting the zener voltage of the zener diodes $ZD_1$ and $ZD_2$ equal to the difference between the DC voltage $V_{dc}$ of the inverter circuit 3 and several tens V, it is possible to make the noise compensation current $i_{C2}$ flow in the same manner as in the first embodiment using the transistors $Tr_1$ and $Tr_2$, the breakdown voltages of which are low.

Figure 4A:
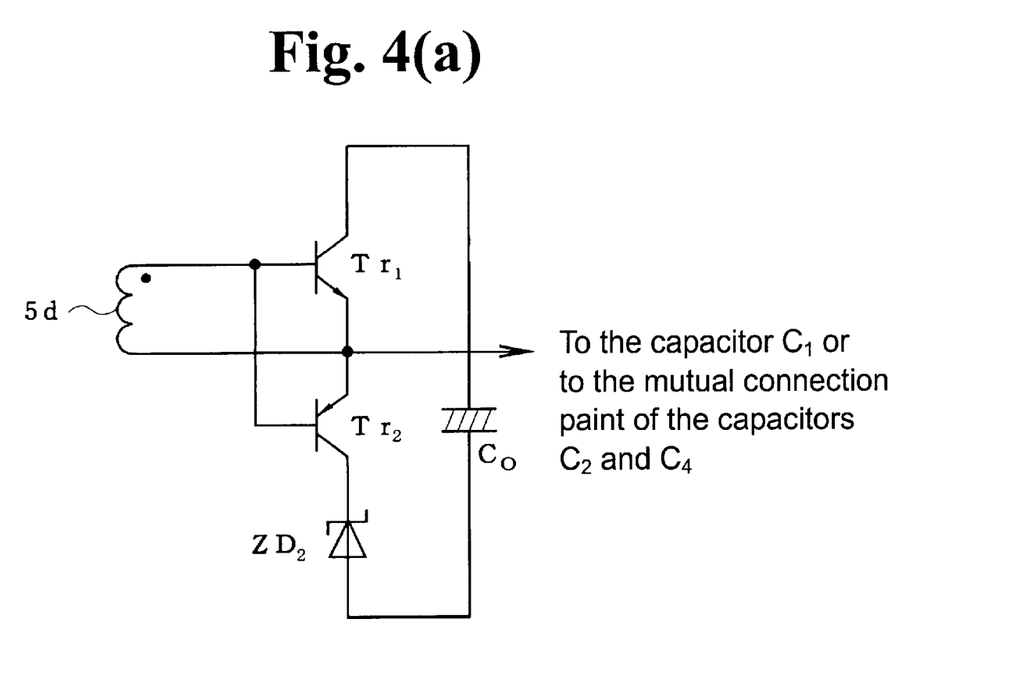
FIG. 4(a) is a circuit diagram showing another connection of a zener diode as a constant DC voltage supply in the noise-compensation-current supply circuit.
Figure 4B:
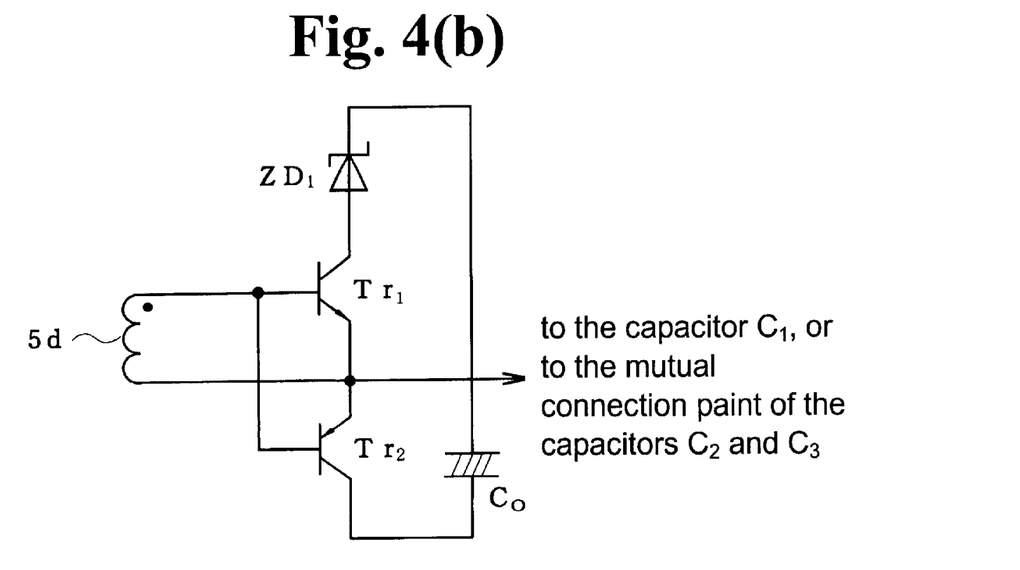
FIG. 4(b) is a circuit diagram showing still another connection of the zener diode as a constant DC voltage supply in the noise-compensation-current supply circuit.

FIG. 4(a) and 4(b) are circuit diagrams showing other connection examples of the zener diode as a constant DC voltage supply in the noise-compensation-current supply circuit. According to the first and the second embodiments, the zener diodes $ZD_1$ and $ZD_2$ are connected to the transistors $Tr_1$ and $Tr_2$, respectively. Alternatively, the noise current compensation circuit may include only the zener diode $ZD_2$ connected to the transistor $Tr_2$ as shown in FIG. 4(a), or only the zener diode $ZD_1$ connected to the transistor $Tr_1$ as shown in FIG. 4(b).

The noise current compensation circuits including only one zener diode work in the same way as the noise current compensation circuits according to the foregoing embodiments, since the coupling capacitor $C_1$ is connected to the mutual connection point of the transistors $Tr_1$ and $Tr_2$ according to the first embodiment, and the filter capacitors $C_2$ and $C_3$ are connected to the mutual connection point of the transistors $Tr_1$ and $Tr_2$ according to the second embodiment such that the coupling capacitor $C_1$ or the filter capacitors $C_2$ and $C_3$ keep the emitter potential of the transistors $Tr_1$ and $Tr_2$ at a predetermined value.

In the previous embodiments, bipolar transistors may be used for the semiconductor switching devices $Q_1$ through $Q_6$ of the inverter circuit 3 in substitution for the IGBTs, and FETs (Field Effect Transistors) may be used for the current control devices of the noise-compensation-current supply circuits 5A and 5B in substitution for the bipolar transistors $Tr_1$ and $Tr_2$.

When it is needed to reduce only the noise current $i_C$ flowing to a specific direction, the noise-compensation-current supply circuit 5A or 5B may include only either of the transistor $Tr_1$ and the zener diode $ZD_1$ or the transistor $Tr_2$ and the zener diode $ZD_2$.

Any DC voltage supply other than the zener diodes may be used for the constant DC voltage supply in the noise-compensation-current supply circuits 6A and 6B.

Alternatively, the voltage obtained by rectifying the voltage from a three-phase AC power supply by a three-phase rectifying bridge circuit may be used for the DC supply voltage of the inverter.

The invention is applicable to a single-phase inverter circuit for driving a single-phase induction motor. Furthermore, the invention is applicable also to a three-phase induction motor for driving a load, the neutral point of which is grounded.

Since the noise-compensation-current supply circuit according to the invention facilitates using devices with a lower breakdown voltage, the operating speed of the noise-compensation-current supply circuit according to the invention is higher than the operating speed of the conventional noise-compensation-current supply circuit which uses devices with a higher breakdown voltage equivalent to the DC voltage of the electric power conversion apparatus.

Therefore, the noise-compensation-current supply circuit according to the invention facilitates reducing the common mode noise current and the normal mode noise current more effectively. Since the noise-compensation-current supply circuit according to the invention does not increase the high frequency noises in the high frequency range, wherein the electric power conversion apparatus operates at 1 MHz or higher frequencies, it is not necessary to add a high frequency filter, and it becomes possible to reduce the number of constituent parts and the size of the system.

Since the device with a lower breakdown voltage is cheaper than that with a high breakdown voltage and the zener diode used for the constant DC voltage supply is usually cheep, the noise-compensation-current supply circuit according to the invention facilitates providing an inexpensive noise reduction device.

While the invention has been explained with reference to the specific embodiments of the invention, the explanation is illustrative and the invention is limited only by the appended claims.

What is claimed is:

1. An electric power conversion apparatus, comprising:
   a converter having an output terminal and an input terminal to be connected to an AC power supply,
   an inverter connected to the output terminal of the converter,
   a DC intermediate circuit having a DC smooth capacitor with two ends interposed between the converter and the inverter,
   noise current detecting means interposed between the converter and the DC intermediate circuit, said noise current detecting means detecting a noise current generated by the inverter and producing a detection signal, and
   noise-compensation-current supply means connected to the DC intermediate circuit for receiving the detection signal from the noise current detecting means and forming and supplying a noise-compensation-current, said noise-compensation-current supply means including a series circuit having a constant DC power supply and a current control device with an output current controlled by the detection signal of the noise current detecting means, said constant DC power supply having a function to lower a voltage applied to the current control device so that a breakdown voltage lower than a voltage of the DC intermediate circuit is used as the current control device.

2. An electric power conversion apparatus according to claim 1, wherein said noise current detecting means is connected to the DC intermediate circuit for detecting one of a common mode noise current flowing from the power conversion apparatus to ground through a load and a normal mode noise current flowing between the AC power supply and the load through the electric power conversion apparatus, and said noise-compensation-current supply means first generates the noise-compensation-current that cancels the noise current flowing through the DC intermediate circuit based on the detection signal from the noise current detecting means, and supplies the noise-compensation-current to the DC intermediate circuit.

3. An electric power conversion apparatus according to claim 1, wherein said noise current detecting means includes a transformer for detecting a difference of noise currents flowing through two lines of the DC intermediate circuit and producing the detection signal; said current control device of the noise-compensation-current supply means includes one output terminal grounded for controlling the output current based on the detection signal from the transformer; and the constant DC power supply is interposed between the other end of the output terminal of the current control device and one end of the DC smooth capacitor to thereby reduce a common mode noise current flowing from the electric power conversion apparatus to a grounded point via the load.

4. An electric power conversion apparatus according to claim 1, wherein said noise current detecting means includes a transformer for detecting a sum of noise currents flowing through two lines of the DC intermediate circuit and producing the detection signal; said current control device of the noise-compensation-current supply means includes one output terminal connected to an input side of the converter for controlling output current based on the detection signal from the transformer; and the constant DC power supply is interposed between the other end of the output terminal of the current control device and one end of the DC smooth capacitor to thereby reduce a normal mode noise current flowing between the AC power supply and the load through the electric power conversion apparatus.

5. An electric power conversion apparatus according to claim 1, wherein said noise current detecting means includes a transformer for detecting a difference of noise currents flowing through two lines of the DC intermediate circuit and producing the detection signal; said current control device of the noise-compensation-current supply means includes two current control devices switching on and off opposite to each other based on the detection signal from the transformer to form the series circuit and having a grounded mutual connection point; and the constant DC power supply is interposed at least between one end of the series circuit and one end of the DC smooth capacitor to thereby reduce a common mode noise current flowing from the electric power conversion apparatus to a grounded point via the load.

6. An electric power conversion apparatus according to claim 1, wherein said noise current detecting means includes a transformer for detecting a sum of noise currents flowing through two lines of the DC intermediate circuit and producing the detection signal; said noise-compensation-current supply means includes two current control devices switching on and off opposite to each other based on the detection signal from the transformer to form the series circuit and having a mutual connection point connected to an input side of the converter; and the constant DC power supply is interposed at least between one end of the second series circuit and one end of the DC smooth capacitor to thereby reduce a normal mode noise current flowing between the AC power supply and the load through the electric power conversion apparatus.

7. An electric power conversion apparatus according to claim 5, wherein said constant DC power supply includes first and second constant DC power supplies interposed between two end of the series circuit and two ends of the DC smooth capacitor, respectively.

8. An electric power conversion apparatus according to claim 6, wherein said constant DC power supply includes first and second constant DC power supplies interposed between two ends of the series circuit and two ends of the DC smooth capacitor, respectively.

9. An electric power conversion apparatus according to claim 3, wherein said current control device has one output terminal, which is not connected to the constant DC power supply, grounded via a coupling capacitor.

10. An electric power conversion apparatus according to claim 4, wherein said current control device has an output terminal, which is not connected to a constant DC power supply, connected to a mutual connection point of two filter capacitors connected between input terminals of the converter.

11. An electric power conversion apparatus according to claim 1, wherein said constant DC power supply comprises a zener diode.

* * * * *